United States Patent
Evans et al.

(10) Patent No.: US 7,869,578 B2
(45) Date of Patent: *Jan. 11, 2011

(54) PRINTER WITH SPEECH TRANSCRIPTION OF A RECORDED VOICE MESSAGE

(75) Inventors: Charles Edward Evans, Corvallis, OR (US); James Richard Emmert, Corvallis, OR (US); Michael Alvin Rencher, Corvallis, OR (US)

(73) Assignee: Marvell International Technology Ltd. (BM)

( * ) Notice: Subject to any disclaimer, the term of this patent is extended or adjusted under 35 U.S.C. 154(b) by 477 days.

This patent is subject to a terminal disclaimer.

(21) Appl. No.: 11/983,494

(22) Filed: Nov. 9, 2007

(65) Prior Publication Data

US 2008/0065379 A1 Mar. 13, 2008

Related U.S. Application Data

(63) Continuation of application No. 10/897,945, filed on Jul. 23, 2004, now Pat. No. 7,302,048.

(51) Int. Cl.
*H04M 1/64* (2006.01)

(52) U.S. Cl. ............... 379/88.14; 347/12; 358/1.15; 379/189; 379/210.01; 455/413; 704/231; 704/235; 705/16; 710/52

(58) Field of Classification Search .......... 347/5, 347/12; 348/231.99; 358/1.14, 1.15; 379/88.01, 379/88.14, 189, 210.01; 396/56, 312, 318; 455/413, 466; 704/231, 235, 260; 705/16, 705/60; 710/52

See application file for complete search history.

(56) References Cited

U.S. PATENT DOCUMENTS

| | | | |
|---|---|---|---|
| 4,964,156 A | | 10/1990 | Blair |
| 5,027,149 A | * | 6/1991 | Hoshino et al. ............... 396/56 |
| 5,051,924 A | | 9/1991 | Bergeron et al. |
| 5,546,145 A | | 8/1996 | Bernardi et al. |
| 5,661,783 A | | 8/1997 | Assis |
| 5,692,225 A | * | 11/1997 | Bernardi et al. ............. 396/318 |
| 6,398,332 B1 | * | 6/2002 | Silverbrook et al. .......... 347/12 |
| 6,453,281 B1 | | 9/2002 | Walters et al. |
| 6,516,359 B1 | | 2/2003 | Kurihara et al. |
| 6,775,651 B1 | * | 8/2004 | Lewis et al. ................. 704/235 |
| 6,795,532 B1 | * | 9/2004 | Gross et al. ............. 379/88.01 |
| 6,826,276 B2 | | 11/2004 | Brown et al. |
| 6,903,839 B1 | | 6/2005 | Laverty et al. |
| 6,930,713 B1 | * | 8/2005 | Adams et al. .......... 348/231.99 |
| 7,184,786 B2 | * | 2/2007 | Mumick et al. ............. 455/466 |
| 7,302,048 B2 | * | 11/2007 | Evans et al. ............. 379/88.14 |
| 7,350,889 B2 | * | 4/2008 | Lapstun et al. ................. 347/5 |
| 7,542,919 B1 | * | 6/2009 | Mueller et al. ................ 705/16 |
| 7,573,995 B2 | * | 8/2009 | Gross et al. ............ 379/210.01 |

(Continued)

*Primary Examiner*—Gerald Gauthier

(57) ABSTRACT

A printer has voice recognition capabilities to transcribe a recorded voice message into printed text. The printer has a communication interface that is connected to a communication line for receiving a voice message. The printer also has an extended memory that stores the voice message, and a speech bank that stores speech patterns and vocabulary words. After the voice message is stored in the extended memory, a speech recognizer compares the voice message to the speech patterns and vocabulary words in the speech bank and translates the voice message into text data. The text data is stored into a print buffer, where the text data may be accessed by a central processing unit (CPU). The CPU controls a print mechanism that actually prints the text data.

20 Claims, 3 Drawing Sheets

U.S. PATENT DOCUMENTS

| | | | |
|---|---|---|---|
| 7,590,347 B2 * | 9/2009 | Silverbrook | 396/312 |
| 7,787,867 B2 * | 8/2010 | Berger et al. | 455/413 |
| 2003/0048469 A1 * | 3/2003 | Hanson | 358/1.14 |
| 2003/0065622 A1 * | 4/2003 | Gargiulo | 705/60 |
| 2004/0034529 A1 * | 2/2004 | Hooper, III | 704/260 |
| 2005/0096905 A1 | 5/2005 | Steinbiss | |

* cited by examiner

PRINTER WITH SPEECH TRANSCRIPTION OF A RECORDED VOICE MESSAGE

This application is a continuation of U.S. patent application Ser. No. 10/897,945, filed Jul. 23, 2004, now U.S. Pat. No. 7,302,048, the entire contents of which are incorporated herein by reference.

BACKGROUND OF THE INVENTION

Telephone answering machines and remote voicemail services are commonly used to record incoming phone messages for people who are unavailable to answer their telephone in person. These answering machines and voicemail services are convenient, but there are some drawbacks.

For example, it is often difficult to write down all of the information that was recorded in a message. It may take several rewinds and replays of the message for a listener to hear the entire message accurately and write it all down. Furthermore, new messages in a remote voicemail service inbox may be easily missed, since one must pick up the phone and call the remote voicemail service to check for any new messages. Therefore, a need remains for an improved device for capturing phone messages.

SUMMARY OF THE INVENTION

In one embodiment, a printer has voice recognition capabilities to transcribe a recorded voice message into printed text. The printer has a communication interface that is connected to a communication line for receiving a voice message. The printer also has an extended memory that stores the voice message, and a speech bank that stores speech patterns and vocabulary words. After the voice message is stored in an extended memory, a speech recognizer compares the voice message to the speech patterns and vocabulary words in the speech bank and translates the voice message into text data. The text data is stored into a print buffer, where the text data may be accessed by a central processing unit (CPU). The CPU controls a print mechanism that actually prints the text data.

In an alternate embodiment, a caller database is added to improve the accuracy of the speech recognizer. The caller database stores speech profiles of callers. After identifying a caller, the printer loads the speech recognizer with the caller's speech profile to perform better recognition on the caller's message.

In an alternate embodiment, a printer has voice recognition capabilities to transcribe a recorded voice message from a voicemail service into printed text. The printer retrieves new messages from the voicemail service to translate them into printed text.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Figure 1:
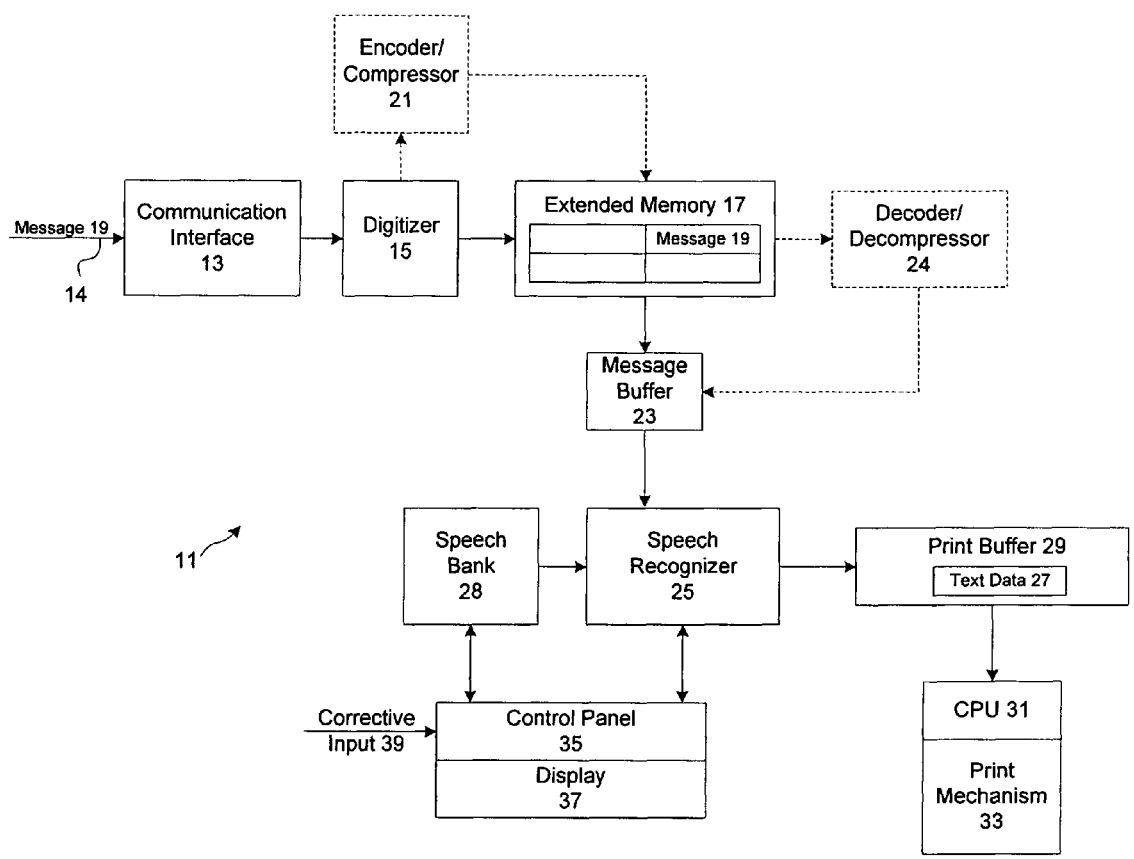
FIG. 1 illustrates a high-level block diagram for a preferred embodiment of a speech-transcribing printer.

FIG. 1 illustrates a high-level block diagram for a preferred embodiment of a speech-transcribing printer 11 ("printer"), made in accordance with the teachings of the present invention. The printer 11 has a communication interface 13 that is connected to a communication line 14. The communication line 14 may be a phone line or an internet connection for Voice over Internet Protocol. The communication interface 13 detects and answers an incoming call over the communication line 14, and receives a voice message 19 ("message") from a caller. The communication interface 13 may also include the capability to store and play an outgoing greeting message to a caller over the communication line 14. The communication interface 13 is connected to a digitizer 15 (such as an analog-to-digital converter), which digitizes the message 19 from the caller and stores it in an extended memory 17. The extended memory 17 should be non-volatile memory so that even if power to the printer 11 is lost, the message 19 remains saved in memory. Furthermore, extended memory 17 should be large enough to store a reasonable number of messages at a time. As indicated by the dashed lines, an optional audio compressor/encoder 21 (such as an MPEG layer-3 (MP3) encoder) compresses and encodes the message 19 for optimal storage in the extended memory 17.

Next, the message 19 is loaded into a message buffer 23 (usually volatile memory) for easier access during the transcription process. It should be understood that if the length of message 19 exceeds the capacity of the message buffer 23, then only a portion of the message 19 should be loaded into the message buffer 23 at any given time. If the message was previously compressed or encoded, the message 19 should be decoded and decompressed by audio decoder/decompressor 24 prior to being loaded into the message buffer 23.

A speech recognizer 25 is coupled to the message buffer 23 and a speech bank 28. Generally, the speech recognizer 25 is a dedicated processing unit, such as a specialized processing block, a digital signal processor, a micro-controller, or other processor. The speech bank 28 is a non-volatile memory pre-loaded with speech patterns and vocabulary words. Speech patterns and vocabulary words vary from language to language, so it may be necessary to customize the speech bank 28 for the primary language of intended use, or to load the speech bank 28 with data for multiple languages if needed. Generally, message 19 should be analyzed in the largest possible segments, and in its entirety if possible, since the speech recognizer 25 can use surrounding words and sentences to give context to the words in the message 19 and thus improve accuracy in recognition.

The speech recognizer 25 analyzes and compares the message 19 with the speech patterns and vocabulary words in the speech bank 28, and translates the message 19 into text data 27, which is stored in a print buffer 29. The text data 27 can be American Standard Code for Information Interchange (ASCII) that represents the letters and words translated from the message 19 by the speech recognizer 25. Other text data formats may also be used—for example, the speech recognizer 25 can translate the message into a printer description language (PDL) such as Printer Control Language (PCL), PostScript, and others.

The printer 11 includes a print mechanism 33 that is controlled by a central processing unit (CPU) 31. The print mechanism 33 can be a print head of an inkjet printer; a laser, drum, and fuser of a laser printer; or other printing mechanism. The CPU 31 accesses the text data 27 stored in the print buffer 29 and sends the text data 27 to the print mechanism 33 for printing. The interactions between the CPU 31 and the print mechanism 33 are well known in the art and therefore will not be described in further detail here. In one embodiment, the same CPU 31 that controls the print mechanism 33 also functions as the speech recognizer 25. This option may be preferable in a low-cost solution for a printer 11.

The printer 11 also includes a control panel 35. The control panel 35 is the user interface to the printer, through which a user can control and modify options for using the printer. The control panel 35 includes a display 37 that, among other things, displays the recognition results from the speech recognizer 25 of a message 19. Since there may be errors in the recognition results, the control panel 35 also accepts corrective input 39 from the user to correct those errors. By providing corrective input 39, the user can train the speech recognizer 25 to better recognize speech and to update the speech bank 28 with vocabulary or speech patterns as needed.

The corrective input 39 may take several forms. In one embodiment, the corrective input 39 comes from a keyboard that is built into the printer 11. The keyboard can be used to input changes or corrections as a message is shown on the display 37. Alternatively, the printer 11 may have a port for connection to a separate, external keyboard, which the user can connect to the printer 11 as needed.

In another embodiment, the corrective input 39 comes from the user's own voice. A microphone and sound card (not shown) attached to the control panel 35 are needed to enter voice input. A user runs through an initial training session with the printer 11 to set up the speech recognizer 25 and adapt the printer 11 to the user's own voice and speech patterns. A keyboard may be needed initially to facilitate the training, and multiple training sessions may be needed to fine-tune the speech recognizer 25. Once the speech recognizer 25 has been trained to recognize the user's voice, the user can simply use his own voice to make corrections in the printer's recognition of other callers' messages. For example, as a selected message is shown on the display 37, the user can use his own voice to indicate where corrections are needed and to make those corrections verbally. In this manner, a keyboard is not needed to input changes or corrections.

In one embodiment of the printer 11, the transcription of a message is not performed immediately after a caller has left the message. Instead, the printer 11 files each message into a memory slot corresponding to a unique identifier (such as a memory address), and displays the identifier for each saved message on the display panel 35. The printer 11 waits for user input via the control panel 35 to select the messages that the user desires to see transcribed. In one embodiment, the printer 11 includes audio components (such as an amplifier and speaker, not shown) for playback of the recorded message to allow the user to hear the message before deciding whether to have the printer 11 transcribe it into printed text.

Figure 2:
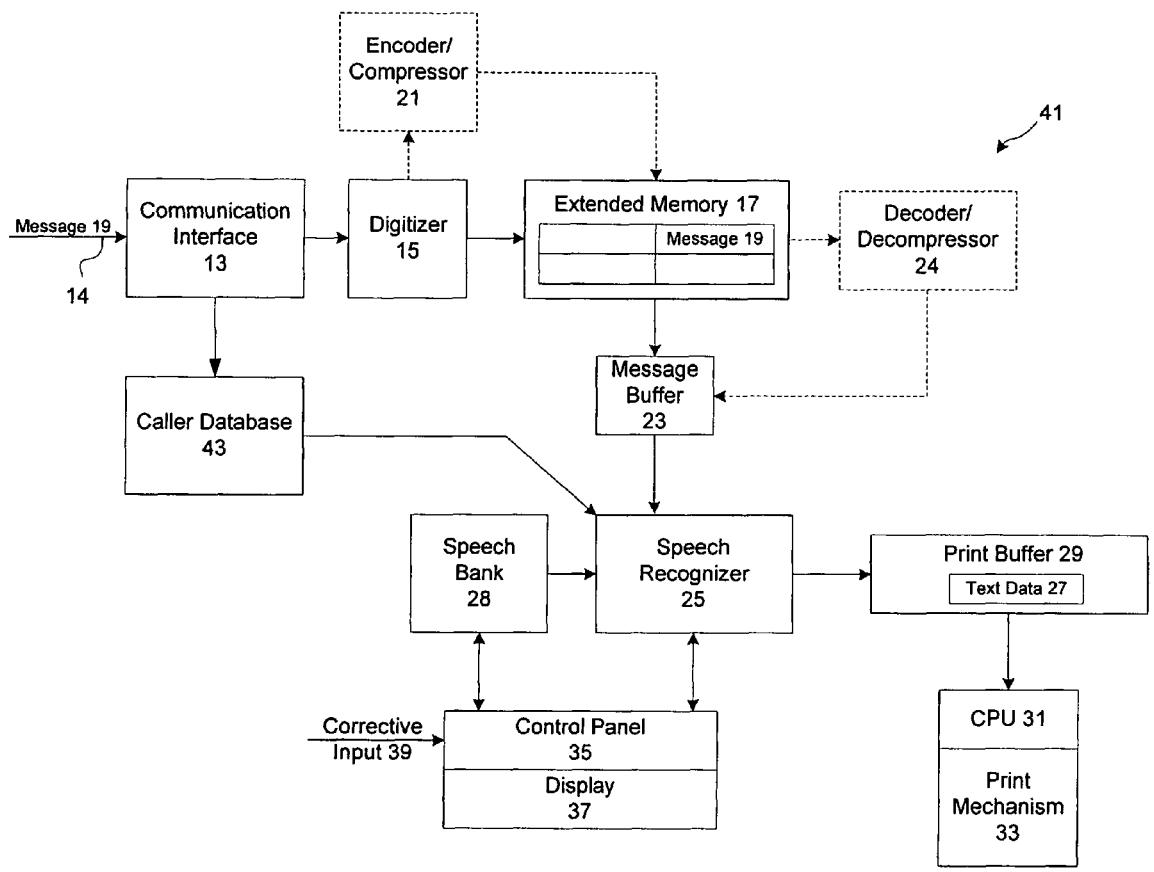
FIG. 2 illustrates another embodiment of a speech-transcribing printer using a database that stores caller profiles.

FIG. 2 illustrates another embodiment of a speech-transcribing printer 41. Printer 41 is similar to the printer 11 of FIG. 1, except for the addition of a caller database 43 coupled to the communication interface 13 and the speech recognizer 25. The caller database 43 is used to improve the accuracy of the speech recognizer 25 by identifying characteristics of the caller, and using those characteristics to tailor the speech recognition to the caller. For example, the user can create a caller database 43 in the printer 11 containing the phone numbers and associated speech profile of a caller at that phone number. The speech profiles may include information such as which primary language the caller uses, whether the caller speaks with an accent, etc. In one embodiment, the communication interface 13 identifies callers who have caller identification (ID) enabled on their phone lines. The printer 41 then uses the caller ID as an index to the caller database 43, and customizes the speech recognizer 25 with the caller's speech profile to perform better recognition on the caller's message.

Alternatively, the communication interface 13 can play an outgoing message that queries the caller with specific questions, such as asking for the caller's name, phone number, or their language of preference. The caller can respond with a voice response, or input a selection using the number buttons on a phone. The response of the caller is used to look up the caller's speech profile in the caller database 43, or the response may be used to customize the speech recognizer 25 directly. The response of the caller may also be used to create or update a profile in the caller database 43.

Figure 3:
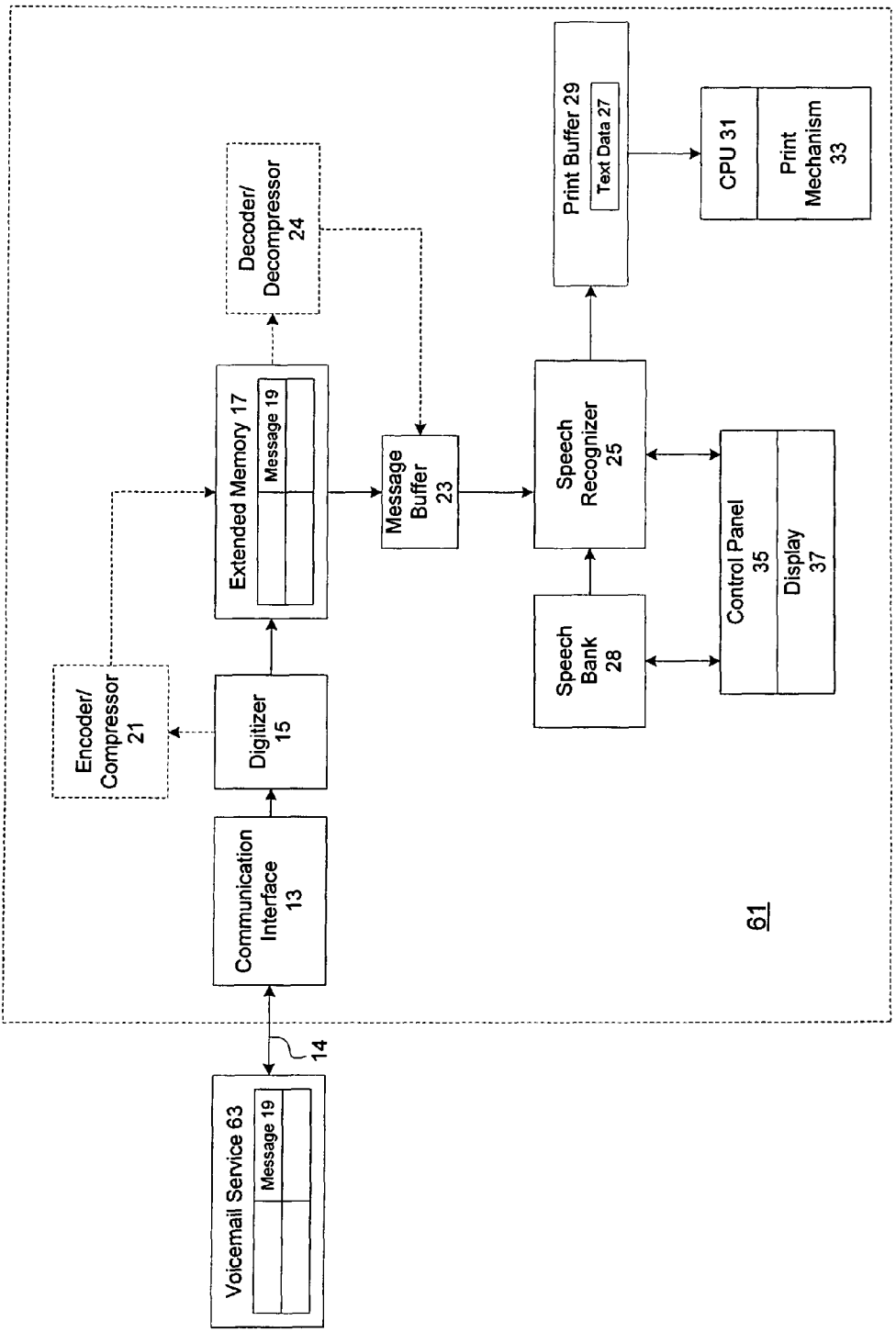
FIG. 3 illustrates yet another embodiment of a speech-transcribing printer for use with a voicemail service.

FIG. 3 illustrates another embodiment of a speech-transcribing printer 61 of the present invention for use with a voice-mail service.

Printer 61 is similar to printer 11 of FIG. 1, except that printer 61 is for use with a voicemail service 63. When a caller dials a phone number and the intended recipient is not available to take the phone call, the caller is redirected to the voicemail service 63, where the caller can leave a message 19 for the intended recipient. Generally the intended recipient also calls the voicemail service 63 to retrieve messages. The printer 61 is connected to the voicemail service 63 via a communication line 14, which may be a phone line, or an internet connection as previously stated.

The communication interface 13 in printer 61 periodically checks the voicemail service 63 for new messages. Different voicemail services 63 have different ways of indicating the presence of a new message. For example, some voicemail services sound a small beep on the line when it is picked up, which can be detected as a particular voltage level. Each printer 61 should be customized to detect a new message on the voicemail service 63 the printer 61 is used with. Once a new message is detected, the communication interface 13 retrieves message 19 and digitizes it using digitizer 15 before storing the message 19 in the extended memory 17. The remaining components of printer 61 and their operation remain unchanged from that of printer 11 in FIG. 1.

Although the present invention has been described in detail with reference to particular preferred embodiments, persons possessing ordinary skill in the art to which this invention pertains will appreciate that various modifications and enhancements may be made without departing from the spirit and scope of the claims that follow.

We claim:

1. A printer circuit comprising:
   a speech recognizer comprising:
      a first input that receives a remotely generated voice message;
      a second input that receives speech patterns and vocabulary words from a speech bank;
      logic for comparing the remotely generated voice message to the speech patterns and vocabulary words from the speech bank and translating the remotely generated voice message into text data, wherein the speech recognizer is operable to have its operation corrected based on corrective input from a user; and
   printing logic that causes the text data to be printed.

2. The printer circuit as in claim 1, wherein the remotely generated voice message comprises digital data.

3. The printer circuit as in claim 1, wherein the corrective input is provided via a keyboard.

4. The printer circuit as in claim 1, wherein the corrective input includes the user's voice.

5. The printer circuit as in claim 1, further comprising an audio encoder to encode and compress the remotely generated voice message for more compact storage.

6. The printer circuit as in claim 1, wherein the text data includes ASCII code.

7. The printer circuit as in claim 1, wherein the text data is based on a printer description language.

8. The printer circuit as in claim 1, wherein the speech recognizer includes a dedicated microprocessor.

9. The printer circuit as in claim 1, wherein the speech recognizer is customized based on a characteristic of a caller associated with the remotely generated voice message.

10. The printer circuit as in claim 9, wherein the characteristic includes as index to a speech profile, and the speech recognizer is customized based on the speech profile.

11. The printer circuit as in claim 9, wherein the characteristic includes an identification number on a communication line.

12. The printer circuit as in claim 9, wherein the characteristic includes a response to a question in an outgoing message from the printer.

13. The printer circuit as in claim 1, wherein the speech recognizer is trainable.

14. A method of printing contents of a voice message, comprising:
   receiving a remotely generated voice message;
   storing speech patterns and vocabulary words within a printer;
   comparing the remotely generated voice message to at least one speech pattern or vocabulary word in the printer, wherein the comparing is based on a characteristic of a caller associated with the remotely generated voice message;
   translating the remotely generated voice message into text data; and
   directing the printer to print the text data.

15. The method of claim 14 further comprising:
   populating a caller database with characteristics of speech indexed by a caller; and
   accessing the caller database according to an input from the caller.

16. The method of claim 15, wherein the input from the caller is caller identification.

17. The method of claim 15, wherein the input from the caller is a voice response.

18. The method of claim 15, wherein the input from the caller is a pressed button.

19. A method of printing contents of a voice message, comprising:
   receiving a remotely generated voice message;
   training a speech recognizer in a printer to recognize speech contained in the remotely generated voice message;
   directing the speech recognizer to compare the speech contained in the remotely generated voice message to at least one of speech patterns or vocabulary words, wherein the speech patterns and vocabulary words are stored in the printer;
   translating the recognized speech into text data; and
   directing the printer to print the text data.

20. The method as in claim 19, further comprising training the speech recognizer to update the stored speech patterns and vocabulary words.

\* \* \* \* \*